Feb. 1, 1938.　　　D. C. WOODHAMS　　　2,107,193
AIR CIRCULATING MEANS FOR MOTOR-DRIVEN VEHICLES
Filed Sept. 22, 1936
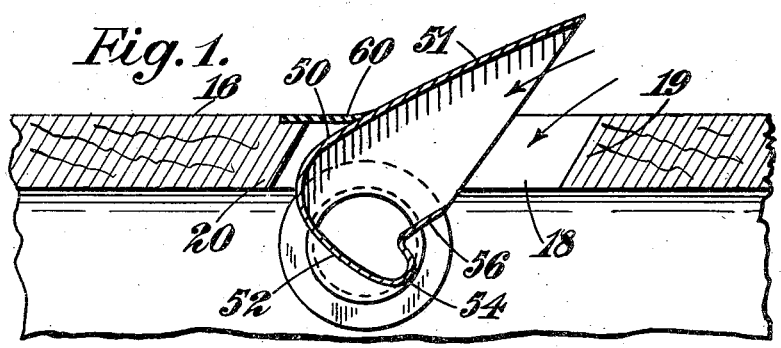
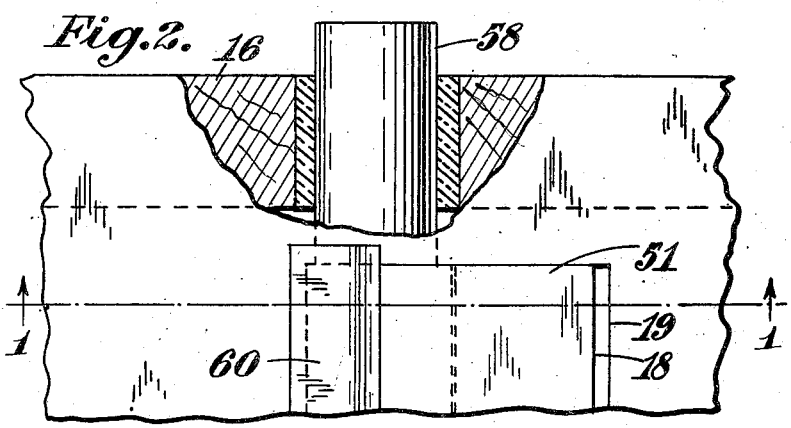
Inventor:
Douglas Crittenden Woodhams,
By Stebbins, Blenko & Parmelee,
Attys.

Patented Feb. 1, 1938

2,107,193

UNITED STATES PATENT OFFICE 2,107,193

AIR-CIRCULATING MEANS FOR MOTOR-DRIVEN VEHICLES

Douglas Cruttenden Woodhams, London, England

Application September 22, 1936, Serial No. 101,992
In Great Britain October 3, 1935

3 Claims. (Cl. 98—2)

This invention relates to air-circulating means for a motor-driven vehicle having a ventilating aperture that is provided or can be formed in the body of the vehicle, e. g. in its roof, for the admission of fresh air.

When motor cars of the saloon type have such a ventilating aperture, which in some cases can be formed by sliding a part of the roof in the fore-and-aft direction of the vehicle, it is sometimes found that there is little or insufficient circulation of air in the car, and the present invention has for one of its objects to promote such circulation and thereby enhance the comfort of the driver and passengers, and to prevent condensation of moisture on the inside of windscreens of vehicles.

According to the invention there is provided a motor-driven vehicle having a ventilating aperture that is provided or can be formed in the body of the vehicle, wherein air-circulating means comprises an air deflector that is arranged in or at a ventilating aperture in the roof, and air-circulating means comprising an air deflector having the form of a horizontal channel that opens in the direction of travel of the vehicle and has its upper side constituting a blade arranged to lie above the roof so as to direct air through the aperture when the vehicle is traveling forwards, which deflector is of U-section and its lower limb has a marginal portion extending upwards to form a groove or trough for the collection of water. The trough of the deflector may have a tube leading therefrom to the outside of the vehicle. Alternatively, two tubes leading from the trough, one at each end, may constitute trunnions serving for pivotally mounting the deflector on the vehicle.

If desired, a plurality of air deflectors may be arranged either side by side extending transversely across the roof of the vehicle, or spaced apart one in front of another in the direction of length of the vehicle on its roof.

One embodiment of the invention is diagrammatically illustrated by way of example in the accompanying drawing, wherein:—

Figure 1 is a vertical section taken on the line 1—1 of Figure 2 showing the roof of a motor-driven vehicle equipped with air-circulating means according to the invention, and Figure 2 is a plan view thereof partly in section.

Like reference characters designate like parts in both views.

Referring to the drawing, a motor-car of the saloon type has in its roof 16 a ventilating aperture 18, whereof the front and rear marginal portions are designated respectively 19 and 20. In order to promote circulation of air in the car, air-circulating means constituted by an air deflector 50 is arranged in the aperture 18.

This channel-shaped deflector 50 opens towards the front of the vehicle and has two limbs 51, 52, and is mounted to swing about a horizontal axis. The lower limb 52, which is shorter than the upper limb 51, is formed with a groove or trough 54 for the collection of water when rain enters the aperture 18. For preventing the collected water from splashing out of the groove or trough, the front side of the latter may be provided with an upwardly-directed lip 56. A tube 58 preferably leads from the trough 54 at one or both ends of the channel to the outside of the vehicle; when two such tubes are provided, one at each end of the deflector, they may constitute trunnions serving for pivotally mounting the deflector on the sides of the body of the vehicle. The closed end of the channel-shaped deflector preferably makes joint with the rear margin of the aperture. As illustrated, a packing member 60, e. g. of rubber, affixed to the part 20 of the roof bears on the upper limb 51 of the deflector for making a fluid-tight joint therewith.

The channel construction described above causes the direction of flow of the incoming air to be reversed, and the air directed towards the windscreen tends to prevent condensation of moisture on the inside of the windscreen.

The invention is applicable in an analogous manner to any saloon-like body, such as an aeroplane cabin or a yacht cabin and is not restricted to road vehicles.

I claim:—

1. A motor-driven vehicle having a ventilating aperture in its roof, and air-circulating means comprising an air-deflector having the form of a horizontal channel that opens in the direction of travel of the vehicle, and has its upper side constituting a blade arranged to lie above the roof so as to direct air through the aperture when the vehicle is traveling forwards, which deflector is of U-section and its lower limb has a marginal portion extending upwards to form a groove or trough for the collection of water.

2. A motor-driven vehicle having a ventilating aperture in its roof, and air-circulating means comprising an air-deflector having the form of a horizontal channel that opens in the direction of travel of the vehicle, and has its upper side constituting a blade arranged to lie above the roof so as to direct air through the aperture when the vehicle is traveling forwards, which deflector constitutes a trough, and a tube leads therefrom to the outside of the vehicle.

3. A motor-driven vehicle having a ventilating aperture in its roof, and air-circulating means comprising an air-deflector having the form of a horizontal channel that opens in the direction of travel of the vehicle, and has its upper side constituting a blade arranged to lie above the roof so as to direct air through the aperture when the vehicle is traveling forwards, which deflector constitutes a trough and two tubes, one at each end, constitute trunnions serving for pivotally mounting the deflector on the vehicle and for placing the trough into open communication with the outside of the vehicle.

DOUGLAS CRUTTENDEN WOODHAMS.